United States Patent [19]
Griffin, Jr. et al.

[11] Patent Number: 5,717,172
[45] Date of Patent: Feb. 10, 1998

[54] SOUND SUPPRESSOR EXHAUST STRUCTURE

[75] Inventors: Ralph Cornelius Griffin, Jr., Los Alamitos; William David Bard, El Segundo; David Brian Schein, Ontario, all of Calif.

[73] Assignee: Northrop Grumman Corporation, Los Angeles, Calif.

[21] Appl. No.: 732,740

[22] Filed: Oct. 18, 1996

[51] Int. Cl.$^6$ .............................. F02K 1/08; B64D 33/04
[52] U.S. Cl. .................. 181/215; 181/216; 239/265.13; 239/265.19
[58] Field of Search ..................... 181/213, 215, 181/216, 219, 210, 286; 239/265.13, 265.19, 265.29

[56] References Cited

U.S. PATENT DOCUMENTS

| | | |
|---|---|---|
| 2,865,169 | 12/1958 | Hausmann . |
| 2,866,316 | 12/1958 | Towle et al. . |
| 2,944,392 | 7/1960 | Tyler . |
| 3,031,156 | 4/1962 | Foster . |
| 3,036,429 | 5/1962 | Schairer . |
| 3,061,038 | 10/1962 | Lawler et al. . |
| 3,587,973 | 6/1971 | Wolf et al. . |
| 3,605,939 | 9/1971 | Duthion . |
| 3,685,612 | 8/1972 | Bertin ........................ 181/216 |
| 3,688,865 | 9/1972 | Smith . |
| 3,706,353 | 12/1972 | Ffowces-Williams et al. ........ 181/216 |
| 3,954,224 | 5/1976 | Colebrook et al. . |
| 3,964,568 | 6/1976 | Neumann ........................ 181/216 |
| 3,976,160 | 8/1976 | Hoch et al. ........................ 181/215 |
| 4,353,516 | 10/1982 | Soligne et al. . |
| 5,291,672 | 3/1994 | Brown ........................ 239/265.13 X |

*Primary Examiner*—Khanh Dang
*Attorney, Agent, or Firm*—Terry J. Anderson; Karl J. Hoch, Jr.

[57] ABSTRACT

A sound suppressor exhaust structure for a jet engine. The exhaust structure has a nozzle body having a generally cylindrical forward intake opening to accommodate an aft end of a jet engine, and a generally quadrilateral aft exit opening. An openable sound suppression chamber is situated aft of the exit opening and is formed by two opposing enclosure structures each having a major surface and each hingedly attached in a clamshell manner to the nozzle body. The opposing enclosure structures are movable between an open and a closed configuration such that, when the enclosure structures are closed, a chamber having a generally quadrilateral cross section is defined and situated aft of the exit opening. Each enclosure structure has a major surface through which are substantially uniformly disposed a plurality of small apertures such that from about 15% to about 25% per square foot of each major surface is void and from about 45 to about 65 apertures are provided per square foot. The apertures here defined are small and tightly spaced to thereby beneficially result in aggressive noise suppression as well as structural light weight.

9 Claims, 1 Drawing Sheet

SOUND SUPPRESSOR EXHAUST STRUCTURE

BACKGROUND OF THE INVENTION

1. Field of the Invention

The present invention relates to a sound suppressor exhaust structure accommodating the aft end of a jet engine, and includes an openable sound suppression chamber having a quadrilateral cross section and defined by opposing enclosure structures each having a major surface through which a plurality of small, tightly-spaced apertures are disposed.

2. Description of the Prior Art

Turbulence created by hot exhaust gas from a jet engine is the primary cause of engine noise. In particular, when a gas blast exits an engine, the outer periphery of the blast cools and consequently slows more quickly than the core of the blast. This velocity differential between the periphery and the core causes turbulence, and the turbulence so created causes noise.

Various sound suppressor devices are taught in the prior art. Many of these devices include apparatus having relatively widely-spaced openings situated behind a jet exhaust pipe for noise suppression during aircraft take-off and possibly stowed elsewhere or otherwise moved during aircraft cruise. Prior art sound suppression devices do not have provisions for variable throat and exit area during an aircraft cruise mode and thus are applicable only to subsonic operation. Additionally, because sound suppressor openings in the prior art are relatively widely spaced and/or relatively large, the achievement of sound suppression may not meet required or desired levels.

In view of the above, it is apparent that a need is present for a sound suppressor exhaust structure having simplicity and enhanced efficacy. In accord therewith, a primary object of the present invention is to provide a sound suppression exhaust structure exhibiting aggressive sound suppression.

Another object of the present invention is to provide a sound suppressor exhaust structure having a sound suppression chamber formed by two opposing enclosures each having a large number of tightly spaced apertures through which exhaust gases are dissipated.

Yet another object of the present invention is to provide a sound suppression exhaust structure having variable throat and exit areas to thereby permit useability during supersonic aircraft operation.

These and other objects of the present invention will become apparent throughout the description which now follows.

SUMMARY OF THE INVENTION

The present invention is a sound suppressor exhaust structure for a jet engine. The exhaust structure comprises, first of all, a nozzle body having a generally cylindrical forward intake opening to accommodate an aft end of a jet engine, and a generally quadrilateral aft exit opening. An openable sound suppression chamber is situated aft of the exit opening and is formed by two opposing enclosure structures each having a major surface and each hingedly attached in a clamshell manner to the nozzle body. The opposing enclosure structures are movable between an open and a closed configuration such that, when the enclosure structures are closed, a chamber having a generally quadrilateral cross section is defined and situated aft of the exit opening. Each enclosure structure has a major surface through which are substantially uniformly disposed a plurality of small apertures such that from about 15% to about 25% per square foot of each major surface is void and from about 45 to about 65 apertures are provided per square foot. When the enclosure structures are in a closed configuration to thereby define a chamber, exhaust gases from the engine enter the chamber and then exit therefrom through the plurality of apertures. The apertures here defined are much more numerous, smaller, and more tightly spaced than prior art concepts, and thereby beneficially result in more aggressive noise suppression as well as structural light weight.

A closed configuration for the enclosure structures is that generally indicated for take-off where noise suppression is usually required. Conversely, where noise abatement is not required as in a normal cruise mode, the enclosure structures are moved to an open mode for direct exit of the gases from the engine. Because the enclosure structures can be positioned between a fully open and a fully closed configuration to thereby permit variable throat and exit areas during a cruise mode, the present exhaust structure is usable for both subsonic and supersonic aircraft operation. By creating a quadrilateral, preferably rectangular, cross section rather than a conventional circular cross section produced by a cone exhaust structure, the number of construction parts and the actuation mechanisms for those parts are respectively minimized and less complicated as compared to sound suppression cone-shaped structures.

DETAILED DESCRIPTION OF THE PREFERRED EMBODIMENT

Figure 1:
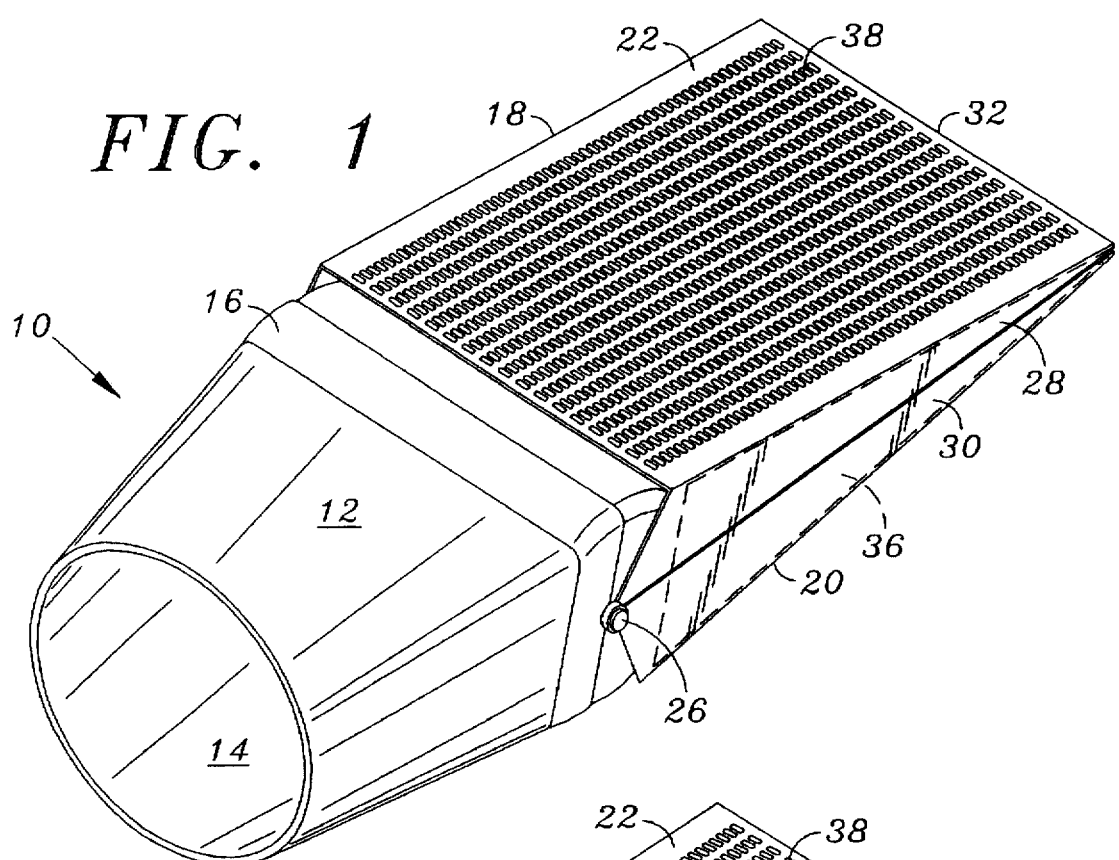
FIG. 1 is a perspective view of a sound suppressor exhaust structure in an aircraft take-off mode.
Figure 2:
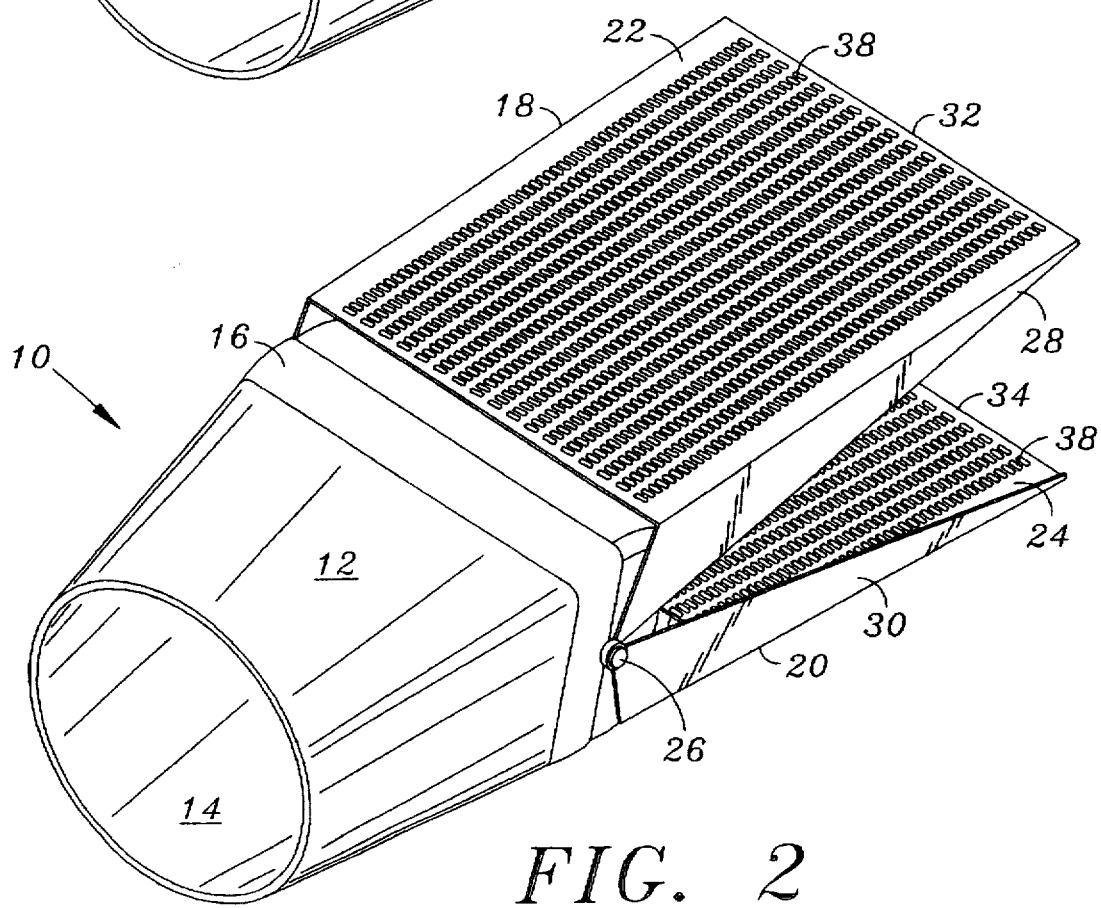
FIG. 2 is a perspective view of the sound suppressions exhaust structure of FIG. 1 in an aircraft cruise mode.

Referring to FIGS. 1 and 2, a sound suppressor exhaust structure 10 is shown. The exhaust structure 10 has a nozzle body 12 with a generally cylindrical forward intake opening 14 to accommodate an aft end of a jet engine, and a generally rectangular aft exit opening defined by the rectangular shape 16 of the aft portion of the nozzle body 12. Situated aft of the exit opening are two opposing enclosure structures 18, 20 each having a major surface 22, 24 and each attached by opposing hinge members 26 to the nozzle body 12 in a clamshell manner. (It is to be noted that a hinge member 26 is shown on only one side of the nozzle body 12, but that an identical hinge member is opposingly disposed on the opposite side of the nozzle body 12.) The opposing enclosure structures 18, 20 are movable from an open configuration as shown in FIG. 2 to a closed configuration as shown in FIG. 1. Each structure 18, 20 has two parallel side walls 28, 30 tapering substantially uniformly in height rearwardly from respective hinge members 26 to respective rear edges 32, 34. When the structures 18, 20 are in a closed configuration (FIG. 1), the rear edges 32, 34 meet while the side walls 28, 30 likewise meet as shown to thereby define a sound suppression chamber 36 into which the exit opening of the nozzle body 12 feeds. Each major surface 22, 24 of each opposing enclosure structure 18, 20 has disposed therethrough a plurality of apertures 38. The apertures 38 are here arranged in columnar symmetry and are provided such that from about 15% to about 25% per square foot of each major surface is void because of the apertures 38 and from about 45 to about 65 apertures are provided per square foot. The size of each aperture 38 is about 0.25 inch wide by 2 inches long, while the shape of each aperture 38 is substantially an elongated ellipse as illustrated in FIGS. 1 and 2. The exhaust structure 10 can be constructed of any material recognizable to the skilled artisan as capable of withstanding and accommodating a jet exhaust environment.

FIG. 1 illustrates the exhaust structure 10 in a closed configuration as found when noise suppression is indicated. The tightly spaced apertures 38 provide aggressive noise suppression as exhaust gases enter the nozzle body 12 and are transferred into the sound suppression chamber 36 for dispersion through the apertures 38. Conversely, FIG. 2 illustrates the exhaust structure 10 in an open configuration as generally used during aircraft cruise. Thus, the single exhaust structure 10 functions as both an acoustic suppression device and a cruise-mode nozzle device. Additionally, because the opposing enclosure structures 18, 20 are positionable between fully open and fully closed configurations, the resulting variable throat and exit-area potential allows for supersonic as well as conventional subsonic aircraft operation.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A sound suppressor exhaust structure for a jet engine, the structure comprising:

a) a nozzle body having a generally cylindrical forward intake opening to accommodate an aft end of a jet engine, and a generally quadrilateral aft exit opening;

b) an openable sound suppression chamber situated aft of the exit opening, the chamber defined by two opposing enclosure structures each having a major surface and each hingedly attached in a clamshell manner to the nozzle body to thereby be movable between an open and a closed configuration such that when closed a chamber having a generally quadrilateral cross section is situated aft of the exit opening; and c) a plurality of apertures disposed through the major surface of each enclosure structure such that from about 15% to about 25% per square foot of each major surface is void and from about 45 to about 65 apertures are provided per square foot.

2. A sound suppressor exhaust structure as claimed in claim 1 wherein the apertures are disposed substantially uniformly through the major surface.

3. A sound suppressor exhaust structure as claimed in claim 1 wherein the major surface of each opposing closure structure has two parallel side walls tapering substantially uniformly in height rearwardly such that when the enclosure structures are in a closed configuration rear edges of each are adjacent each other.

4. A sound suppressor exhaust structure as claimed in claim 3 wherein the aft exit opening of the nozzle body is a rectangle.

5. A sound suppressor exhaust structure as claimed in claim 1 wherein the aft exit opening of the nozzle body is a rectangle.

6. A sound suppressor exhaust structure as claimed in claim 4 wherein the cross section of the closed chamber is a rectangle.

7. A sound suppressor exhaust structure as claimed in claim 1 wherein the small apertures are substantially elongatedly elliptical in shape.

8. A sound suppressor exhaust structure as claimed in claim 7 wherein each aperture is about 0.25 inch wide by 2 inches long.

9. A sound suppressor exhaust structure as claimed in claim 2 wherein each aperture is about 0.25 inch wide by 2 inches long.

* * * * *